US006810178B2

(12) United States Patent
Davis et al.

(10) Patent No.: US 6,810,178 B2
(45) Date of Patent: Oct. 26, 2004

(54) LARGE DIAMETER OPTICAL WAVEGUIDE HAVING BLAZED GRATING THEREIN

(75) Inventors: Michael A. Davis, Galstonbury, CT (US); Alan D. Kersey, South Glastonbury, CT (US)

(73) Assignee: CiDRA Corporation, Wallingford, CT (US)

(*) Notice: Subject to any disclaimer, the term of this patent is extended or adjusted under 35 U.S.C. 154(b) by 125 days.

(21) Appl. No.: 10/098,923

(22) Filed: Mar. 16, 2002

(65) Prior Publication Data

US 2003/0174948 A1 Sep. 18, 2003

Related U.S. Application Data

(63) Continuation-in-part of application No. 09/707,084, filed on Nov. 6, 2000, which is a continuation-in-part of application No. 09/691,997, filed on Oct. 19, 2000, which is a continuation-in-part of application No. 09/699,940, filed on Oct. 30, 2000, which is a continuation-in-part of application No. 09/519,240, filed on Mar. 6, 2000, which is a continuation of application No. 09/456,112, filed on Dec. 6, 1999, now Pat. No. 6,229,827, which is a continuation-in-part of application No. 09/400,362, filed on Sep. 20, 1999, now abandoned, which is a continuation-in-part of application No. 09/399,495, filed on Sep. 20, 1999, now abandoned, which is a continuation-in-part of application No. 09/205,943, filed on Dec. 4, 1998, now abandoned, which is a continuation-in-part of application No. 09/205,846, filed on Dec. 4, 1998, now abandoned.

(60) Provisional application No. 60/276,456, filed on Mar. 16, 2001.

(51) Int. Cl.⁷ .................................................. G02B 6/34

(52) U.S. Cl. ................................................... 385/37

(58) Field of Search ............................... 385/37, 12, 13

(56) References Cited

U.S. PATENT DOCUMENTS 3,891,302 A   6/1975   Dabby et al. ................ 350/96
3,916,182 A   10/1975  Dabby et al. ................ 250/199

(List continued on next page.)

FOREIGN PATENT DOCUMENTS

DE   19724528   12/1998
EP   0320990    6/1989

(List continued on next page.)

OTHER PUBLICATIONS

V.C. Lauridsen, J.H. Povisen and P. Varming "Design of DFB Fibre Lasers", Electron Lett., vol. 34, No. 21, pp. 2028–2030, 1998.

(List continued on next page.)

Primary Examiner—Nimeshkumar D. Patel
Assistant Examiner—Sumati Krishnan (57) ABSTRACT

A large diameter waveguide is provided having a diameter of at least about 0.3 millimeters, and an outer cladding with an inner core with a blazed grating included therein, which is written into the inner core at an oblique angle relative to a longitudinal axis of the inner core either for attenuating optical light traveling in the optical waveguide, or for reflecting optical light to or from the optical waveguide. The blazed grating has an optical parameter that changes in response to an application of a compressive force on the optical waveguide. The outer cladding may have the blazed grating written therein. The blazed grating has concatenated periodic or aperiodic gratings. The optical waveguide may be shaped like a dogbone structure having wider outer sections and a narrower central section inbetween. The blazed grating is written in the narrower central section of the dogbone structure.

17 Claims, 3 Drawing Sheets

U.S. PATENT DOCUMENTS

| | | | |
|---|---|---|---|
| 4,295,739 A | 10/1981 | Meltz et al. | 356/43 |
| 4,704,151 A | 11/1987 | Keck | 65/4.1 |
| 4,762,392 A | 8/1988 | Yamamoto et al. | 350/96.3 |
| 4,915,467 A | 4/1990 | Berkey | 350/96.15 |
| 4,948,217 A | 8/1990 | Keck et al. | 350/96.15 |
| 5,007,705 A | 4/1991 | Morey et al. | |
| 5,042,898 A | 8/1991 | Morey et al. | 385/37 |
| 5,125,946 A | 6/1992 | Bhagavatula | 65/106 |
| 5,136,677 A | 8/1992 | Drexhage et al. | 385/123 |
| 5,235,659 A | 8/1993 | Atkins et al. | 385/124 |
| 5,237,638 A | 8/1993 | Narcisco, Jr. | 385/123 |
| 5,469,520 A | 11/1995 | Morey et al. | 385/37 |
| 5,479,551 A | 12/1995 | DiGiovanni et al. | 385/123 |
| 5,511,083 A | 4/1996 | D'Amato et al. | 372/6 |
| 5,519,801 A | 5/1996 | Le Noane et al. | 385/115 |
| 5,519,803 A | 5/1996 | Shiono | 385/132 |
| 5,546,483 A * | 8/1996 | Inoue et al. | 385/14 |
| 5,666,372 A | 9/1997 | Ball et al. | 372/6 |
| 5,682,453 A | 10/1997 | Daniel et al. | 385/99 |
| 5,691,999 A | 11/1997 | Ball et al. | 372/20 |
| 5,699,377 A | 12/1997 | Pan | 372/92 |
| 5,745,617 A * | 4/1998 | Starodubov et al. | 385/37 |
| 5,745,626 A | 4/1998 | Duck et al. | 385/96 |
| 5,771,251 A | 6/1998 | Kringlebotn et al. | 372/6 |
| 5,817,944 A | 10/1998 | Chung | 73/768 |
| 5,841,131 A | 11/1998 | Schroeder et al. | 250/227.17 |
| 5,933,437 A | 8/1999 | Delavaux | 372/6 |
| 5,999,671 A * | 12/1999 | Jin et al. | 385/37 |
| 6,018,534 A | 1/2000 | Pan et al. | 372/6 |
| 6,104,852 A * | 8/2000 | Kashyap | 385/123 |
| 6,229,827 B1 | 5/2001 | Fernald et al. | 372/20 |

FOREIGN PATENT DOCUMENTS

| | | |
|---|---|---|
| EP | 0352751 | 1/1990 |
| EP | 0212954 | 9/1991 |
| EP | 0162303 | 12/1991 |
| EP | 0359351 | 9/1992 |
| EP | 0572169 | 12/1993 |
| EP | 0302745 | 3/1994 |
| EP | 0409447 | 11/1996 |
| EP | 0884614 | 6/1997 |
| EP | 0962791 | 12/1999 |
| WO | WO8204328 | 12/1982 |
| WO | WO9530926 | 11/1995 |
| WO | WO0037969 | 6/2000 |

OTHER PUBLICATIONS

P. Varming, J. Hubner and M. Dejka, "Erbium doped fibre DFB laser with permanent $\pi/2$ phase–shift induced by UV post–processing", IOOC'95, Tech. Digest vol. 5, PD1–3, 1995.

J.L. Cruz, L. Dong and L. Reekie "Improved thermal sensitivity of fibre Bragg gratings using a polymer overlayer", Electronics Letters, vol. 32, No. 4, pp. 385–387.

Pan, J.J. et al, "166–MW Single Frequency Output Power Iterative Fiber Lasers with Low Noise", IEEE Photonics Technology Letters, IEEE Inc., New York, vol. 11, No. 1, 01/1999.

Hamza, A.A., et al., "Measurement Refractive Indices of Homogenous Fibers with Regular or Irregular Transverse Sections" Journal of Applied Physics, American Institute of Physics, New York, vol. 68, No. 6, 9/1990.

Yu Lung Lo, Member SPIE, "Large Diameter Optical Waveguide, Grating and Laser" Optical Engineering, vol. 37, No. 8, Aug. 1998, pp. 2272–2276.

"Bragg Grating Fast Tunable Filter for Wavelength Division Multiplexing", by Iocco et al, Journal of Lightwave Technology, vol. 17, No. 7, Jul. 1999.

"Interactive Fiber Laser with Low Noise and Controlled Output Power", E–TEK Dynamics/Whitepapers, by Pan et al, 11/99.

* cited by examiner

LARGE DIAMETER OPTICAL WAVEGUIDE HAVING BLAZED GRATING THEREIN

CROSS-REFERENCE TO RELATED APPLICATIONS

This application claims the benefit of U.S. patent application Ser. No. 09/455,868, filed Dec. 12, 1999; U.S. patent application Ser. No. 09/455,865, filed Dec. 6, 1999, which is a continuation-in-part of U.S. patent application Ser. No. 09/399,495, filed Sep. 20, 1999, now abandoned, which is continuation in part of U.S. patent application Ser. No. 09/205,943, filed Dec. 4, 1998, now abandoned; U.S. application Ser. No. 09/707,084, filed Nov. 6, 2000, which is a continuation-in-part of U.S. patent application Ser. No. 09/691,997, filed Oct. 19, 2000, which is continuation of U.S. patent application Ser. No. 09/456,112, filed Dec. 6, 1999, now granted (U.S. Pat. No. 6,229,827), which is a continuation-in-part of U.S. patent application Ser. No. 09/400,362 filed Sep. 20, 1999, now abandoned, which is a continuation-in-part of U.S. patent application Ser. No. 09/205,846, filed Dec. 4, 1998, now abandoned; U.S. application Ser. No. 09/699,940, filed Oct. 30, 2000, which is a continuation-in-part of U.S. patent application Ser. No. 09/519,240, filed Mar. 6, 2000; and U.S. Provisional Application No. 60/276,456, filed Mar. 16, 2001; and is further related to applications filed concurrently herewith, entitled "Optical Grating Based Filter", Ser. No. 10/098,890; and "Wavelength Monitor Utilizing a Tunable Bragg Grating and Blazed Grating", Ser. No. 10/098,924, all of which are hereby incorporated by reference in their entirety.

BACKGROUND OF THE INVENTION

1. Technical Field

The present invention generally relates to an optical component; and more particularly to an optical component having a Bragg grating written therein.

2. Description of Related Art

U.S. Pat. No. 5,337,382 discloses a 125 micron optical fiber having a Bragg grating written therein at an oblique angle, which are known in the art as blazed gratings. The subject matter of U.S. Pat. No. 5,337,382 is hereby incorporated by reference herein. One disadvantage of this optical fiber design is that it is not readily adaptable to compression-based designs for tuning the Bragg grating, because the 125 micron optical fiber tends to buckle under a compressive force. Thus, it is advantageous and desirable to provide an optical component that is readily adaptable to compression-based designs for tuning the Bragg grating without bending.

SUMMARY OF THE INVENTION

In its broadest sense, the present invention provides a large diameter optical waveguide having a diameter of at least about 0.3 millimeters, and an outer cladding surrounding an inner core with a blazed grating therein. The blazed grating is written into the inner core at an oblique angle relative to a longitudinal axis of the inner core for attenuating optical light traveling in the optical waveguide, or for reflecting and coupling optical light to or from the optical waveguide and a light source or receiver.

The blazed grating has an optical parameter that changes in response to an application of a compressive force on the optical waveguide. The blazed grating may include a plurality of concatenated periodic or aperiodic gratings. The outer cladding may also have the blazed grating written therein, or a combination of the inner core and the cladding may have the blazed grating therein. The optical waveguide may be shaped like a dogbone structure having wider outer sections and a narrower central section inbetween. The blazed grating is written in the narrower central section of the dogbone structure. The narrower central section may have a tapered shape, including linear, quadratic or step-like tapering. The narrower intermediate section may also have a thermal device wrapped around, or otherwise positioned in heat exchange relationship with, the narrower central section of the optical waveguide to tune the center wavelength of the blazed grating along a spectral range.

The large diameter waveguide having the blazed grating therein and the compression-based tuning approach for tuning the same will open up a whole new host of optical coupling applications, optical attenuating applications, as well as parameter sensing applications and optical signal filtering applications not otherwise possible when using the prior art 125 micron tension-based tuned optical fiber.

The foregoing and other objects, features and advantages of the present invention will become more apparent in light of the following detailed description of exemplary embodiments thereof.

BRIEF DESCRIPTION OF THE DRAWING

The drawing, not drawn to scale, include the following Figures:

FIG. 5 includes FIGS. 5a, 5b, 5c.

BEST MODE FOR CARRYING OUT THE INVENTION

Figure 1:
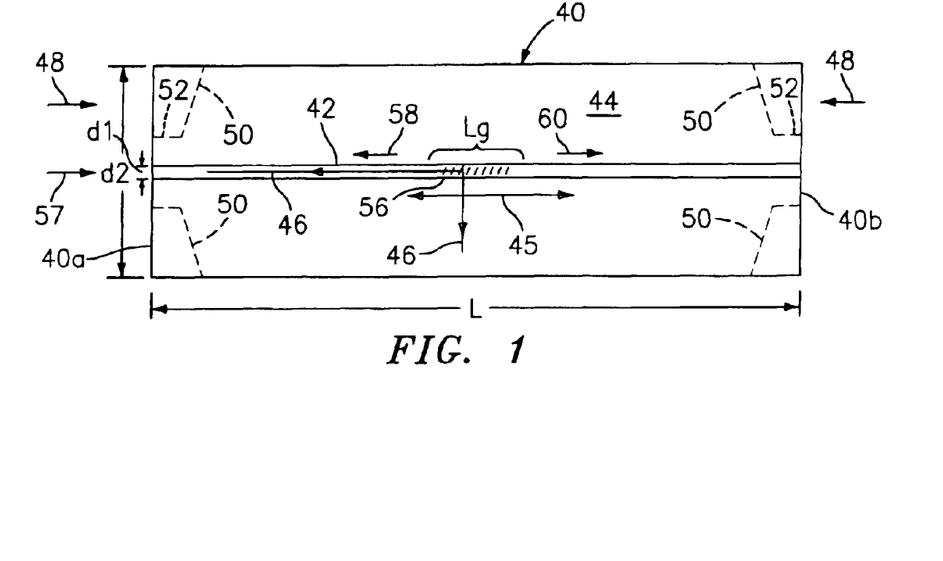
FIG. 1 is a side view of a large diameter optical waveguide having a blazed grating written therein in accordance with the present invention.

FIG. 1: The Basic Invention

FIG. 1 shows a large diameter optical waveguide 40 having an outer cladding 44 surrounding an inner core 42, opposing ends 40a, 40b, and a diameter d2 of at least about 0.3 millimeters, similar to that disclosed in the aforementioned co-pending U.S. patent application, Ser. No. 09/455,868. The inner core 42 has a blazed grating 56 written therein at an oblique angle relative to a longitudinal axis of the inner core 42 either for attenuating optical light 45 traveling in the optical waveguide 40, or for reflecting optical light 46 to or from the optical waveguide 40 and a light source or receiver as is known in the art (not shown).

The blazed grating 56 has an optical parameter and may be tuned by applying a compressive force indicated by arrows 48 on opposite ends of the optical waveguide 40.

The Large Diameter Optical Waveguide Structure

The large diameter optical waveguide 40 comprises silica glass ($SiO_2$) based material having the appropriate dopants, as is known, to allow light indicated by arrow 45 to propagate in either direction along the inner core 42 and/or within the large diameter optical waveguide 40. The inner core 42 has an outer dimension d1 and the large diameter optical waveguide 40 has an outer dimension d2. Other materials for the large diameter optical waveguide 40 may be used if desired. For example, the large diameter optical waveguide 40 may be made of any glass, e.g., silica, phosphate glass, or other glasses; or solely plastic.

The outer dimension d2 of the outer cladding 44 is at least about 0.3 millimeters; and the outer dimension d1 of the inner core 42 is such that it propagates only a few spatial modes (e.g., less than about 6). For example for single spatial mode propagation, the inner core 42 has a substantially circular transverse cross-sectional shape with a diameter d1 less than about 12.5 microns, depending on the wavelength of light. The invention will also work with larger or non-circular cores that propagate a few (less than about 6) spatial modes, in one or more transverse directions. The outer diameter d2 of the outer cladding 44 and the length L have values that will resist buckling when the large diameter optical waveguide 40 is placed in axial compression as indicated by the arrows 48.

The large diameter optical waveguide 40 may be ground or etched to provide tapered (or beveled or angled) outer corners or edges 50 to provide a seat for the large diameter optical waveguide 40 to mate with another part (See FIG. 3) and/or to adjust the force angles on the large diameter optical waveguide 40, or for other reasons. The angle of the beveled corners 50 is set to achieve the desired function. Further, the large diameter optical waveguide 40 may be etched or ground to provide nubs 52 for an attachment of a pigtail assembly 54 (see FIG. 2a) to the large diameter optical waveguide 40. Further, the size of the large diameter optical waveguide 40 has inherent mechanical rigidity that improves packaging options and reduces bend losses.

The large diameter optical waveguide 40 has the blazed Bragg grating 56 impressed (or embedded or imprinted) therein. The blazed Bragg grating 56, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are all hereby incorporated by reference to the extent necessary to understand the background art of the present invention. The aperiodic variation of the blazed grating 56 may include a chirped grating. See also U.S. Pat. Nos. 5,042,897 and 5,061,032, both issued to Meltz et al, and also hereby incorporated by reference to the extent necessary to understand the background art of the present invention. As shown, the blazed grating 56 is written in the inner core 42; however, the scope of the invention is intended to include writing the grating in the outer cladding 44, as well as a combination of the inner core 42 and the outer cladding 44. Any type of wavelength-tunable blazed grating or reflective element embedded, etched, imprinted, or otherwise formed in the large diameter optical waveguide 40 may be used. The large diameter optical waveguide 40 may be photosensitive if the blazed Bragg grating 56 are to be written into the large diameter optical waveguide 40. As used herein, the term blazed "grating" means any of such reflective elements. Further, the blazed reflective element (or grating) 56 may be used in reflection and/or transmission of light. The light 57 incident on the blazed Bragg grating 56 reflects a portion thereof as indicated by a line 58, and passes the remaining incident light 57 (within a predetermined wavelength range), as indicated by a line 60 (as is known).

In alternative embodiments the waveguide 40, having all of the various features and advantages described herein, may comprise an inner cladding positioned between the core and the outer cladding. Further, the present invention includes waveguides 40 having various different cladding layers comprising glass layers having different refractive indexes or other optical qualities.

The blazed grating 56 has a grating length Lg, which is determined based on the application, may be any desired length. A typical blazed grating 56 has a grating length Lg in the range of about 3–40 millimeters. Other sizes or ranges may be used if desired. The length Lg of the blazed grating 56 may be shorter than or substantially the same length as the length L of the large diameter optical waveguide 40. Also, the inner core 42 need not be located in the center of the large diameter optical waveguide 40 but may be located anywhere in the large diameter optical waveguide 40.

Accordingly, we have found that an outer diameter d2 of greater than about 400 microns (0.4 millimeters) provides acceptable results (without buckling) for a waveguide length L of 5 millimeters, over a grating wavelength tuning range of about 10 nanometers. For a given outer diameter d2, as the length L increases, the wavelength tuning range (without buckling) decreases. Other diameters d2 for the large diameter optical waveguide 40, may be used depending on the overall length L of the large diameter optical waveguide 40 and the desired amount of compression length change $\Delta L$ or wavelength shift $\Delta \lambda$.

The large diameter optical waveguide 40 may be made using fiber drawing techniques now known or later developed that provide the resultant desired dimensions for the core and the outer diameter discussed hereinbefore. As such, the external surface of the large diameter optical waveguide 40 will likely be optically flat, thereby allowing blazed Bragg gratings to be written through the cladding similar to that which is done for conventional optical fiber. Because the large diameter optical waveguide 40 has a large outer diameter compared to that of a standard optical fiber (e.g., 125 microns), the large diameter optical waveguide 40 may not need to be coated with a buffer and then stripped to write the gratings, thereby requiring less steps than that needed for conventional optical fiber gratings. Also, the large outer diameter d2 of the large diameter optical waveguide 40 allows the waveguide to be ground, etched or machined while retaining the mechanical strength of the large diameter optical waveguide 40. Thus, the present invention is easily manufacturable and easy to handle. Also, the large diameter optical waveguide 40 may be made in long lengths (on the order of many inches, feet, or meters) then cut to size as needed for the desired application.

Also, the large diameter optical waveguide 40 does not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level at the air-to-glass interface for a focused writing beam.

We have also found that the present invention also reduces coupling between the core and cladding modes due to the increased end cross-sectional area between the core and cladding of the waveguide. Thus, the blazed grating 56 written in the inner core 42 of the large diameter optical waveguide 40 exhibits less optical transmission loss and exhibits a cleaner optical profile than a conventional fiber grating because the large cladding region dissipates coupled cladding modes, thereby reducing the coupling of the inner core 42 to the outer cladding 44 modes. In general, the greater the difference in cross-sectional area between the inner core 42 and the outer cladding 44 the smaller the mode field overlap and the lower the coupling to the cladding modes. The thickness of the outer cladding 44 between the cladding outer diameter and the core outer diameter may be set to optimize this effect. Other diameters of the inner core 42 and the large diameter optical waveguide 40 may be used if desired such that the cladding modes are reduced to the desired levels.

The large diameter optical waveguide 40 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

Figure 2A:
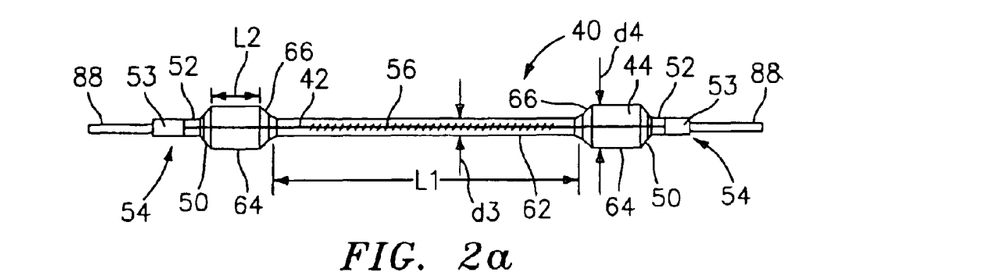
FIG. 2a is a side view of another embodiment of a large diameter optical waveguide having a blazed grating written therein in accordance with the present invention.

FIG. 2*a*: The Dogbone Shaped Structure

FIG. 2*a* shows a side cross-section of the outer surface of the large diameter optical waveguide 40, which may have a varying geometry depending on the application. For example, the large diameter optical waveguide 40 may have a "dogbone" shape with a narrower central section 62 and wider or larger outer sections 64. The dogbone shape may be used to provide increased sensitivity in converting axial force to length change ΔL and/or wavelength shift Δλ of the blazed grating 56 and may be achieved by etching, grinding, machining, heating and stretching, or other known techniques.

The narrower central section 62 may have an outer diameter d3 of about 0.8–1 millimeter, and a length L of about 5–20 millimeter. The wider outer sections 64 each have a diameter d4 of about 3 millimeter and a length L2 of about 2–5 millimeter. The overall length L1 is about 10–30 millimeter and the multi-component grating has a length Lg of about 5–20 millimeter. Other lengths and diameters of the sections 62, 64 may be used. Other dimensions and lengths for the grating element 40 and the multi-component grating may be used.

An inner transition region 66 of the wider outer sections 64 may be a sharp vertical or angled edge or may be curved. A curved geometry has less stress risers than a sharp edge and thus may reduce the likelihood of breakage. Further, the wider outer sections 64 may have tapered (or beveled) outer corners 50.

We have found that such a dimension change between the dimension d4 of the wider outer sections 64 and the dimension d3 of the narrower central section 62 provides increased force to grating wavelength shift sensitivity (or gain or scale factor) by strain amplification. Also, the dimensions provided herein for the dogbone are easily scalable to provide the desired amount of sensitivity.

The dimensions and geometries for any of the embodiments described herein are merely for illustrative purposes and, as such, any other dimensions may be used if desired, depending on the application, size, performance, manufacturing requirements, or other factors, in view of the teachings herein.

The angle of the beveled corners 50 is set to achieve the desired function. In addition, one or both of the outer or axial ends of the large diameter optical waveguide 40 where a pigtail 53 of the pigtail assembly 54 attaches may have an outer tapered (or fluted, conical, or nipple) axial section 52.

Alternatively, the optical waveguide 40 may be formed by heating, collapsing and fusing a glass capillary tube to a fiber (not shown) by a laser, filament, flame, etc., as is described in the aforementioned co-pending U.S. patent application Ser. No. 09/455,865. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are also incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

The blazed Bragg grating 56 may be written in the inner core 42 before or after the capillary tube is encased around and fused to the fiber, such as described in the aforementioned co-pending U.S. patent application Ser. No. 09/455,865. If the blazed grating 56 is written in the fiber after the tube is encased around the grating, the grating may be written through the tube into the fiber by any desired technique, such as is described in co-pending U.S. patent application, Ser. No. 09/205,845, entitled "Method and Apparatus For Forming A Tube-Encased Bragg Grating", filed Dec. 4, 1998, which is incorporated herein by reference.

It is well known that the center wavelength at which a blazed Bragg grating reflects may shift up or down due to the expansion or contraction of the large diameter optical waveguide 40, in response to the changes in temperature or other environmental factors. Thus, it is desirable to provide a tuning mechanism to compensate for a spectral shift due to change in temperature.

Figure 2B:
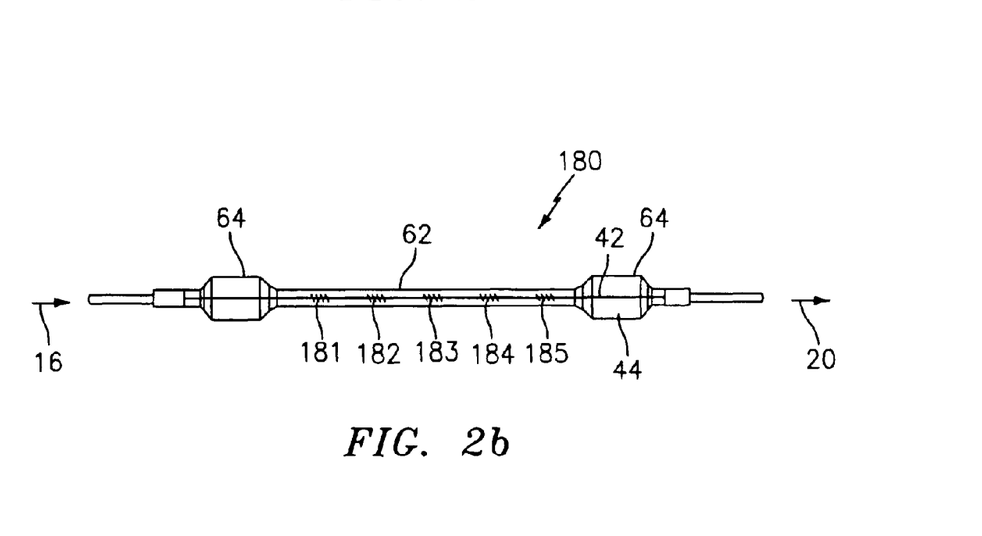
FIG. 2b is a side view of another embodiment of a large diameter optical waveguide having a plurality of concatenated blazed Bragg gratings written therein in accordance with the present invention.

FIG. 2*b*: Concatenated Periodic and/or Aperiodic Blazed Gratings

FIG. 2*b* shows a large diameter optical waveguide 180 having a plurality of concatenated periodic and/or aperiodic blazed gratings 181, 182, 183, 184 and 185 spaced along the inner core 42 of the narrower central section 62, wherein each blazed grating 181–185 is representative of a component of the Fourier series defining, for example, a desired grating profile. The blazed gratings 181–185 are written into the inner core 42 at an oblique angle relative to the axis of the core to reflect the optical signal into the outer cladding 44 of the large diameter optical waveguide 180 and pass the output signal 20. It is also contemplated by the present invention that the concatenated blazed gratings 181–185 of FIG. 2*b* may be written in an optical waveguide having a non-uniform central section, similar to that described below in relation to FIGS. 5a, 5b, 5c.

Figure 3:
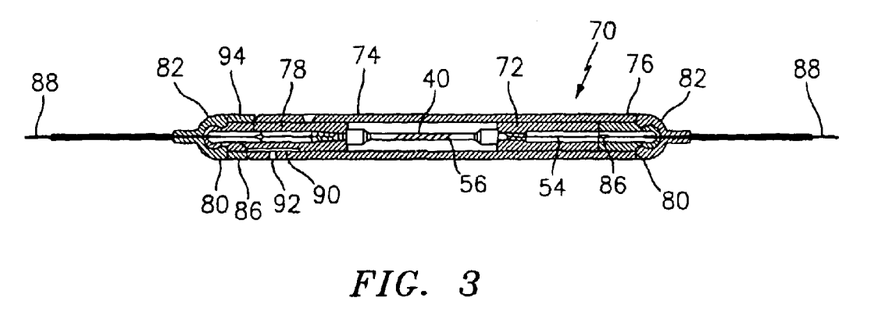
FIG. 3 is a cross-sectional view of an athermal device having an optical waveguide therein similar to that shown in FIG. 2a in accordance with the present invention.

FIG. 3: The Athermal Device

FIG. 3 shows an athermal device 70 for compression-tuning the large diameter optical waveguide 40 to compensate for changes in temperature, which is similar to the athermal device described in U.S. Pat. Ser. No. 09/699,940, entitled "Temperature Compensated Optical Device", which is incorporated herein by reference. The athermal device 70 includes the large diameter optical waveguide 40, attached pigtail assemblies 54, and a compensating spacer or rod 72, disposed in a tubular housing 74 formed of a high strength metal or metal alloy material, preferably having a low CTE that is higher than silica.

A fixed end cap 76 and an adjustable end cap 78, which are formed of similar material as the tubular housing are welded in respective ends of the tubular housing 74 to secure and maintain in axial alignment the optical waveguide and compensating spacer 72. Both the fixed end cap 76 and the adjustable end cap 78 extend outward from the end of the tubular housing 74, and include a circumferential groove 80 for receiving a respective strain relief boot 82. Further, the fixed end cap 76 and the adjustable end cap 78 include a bore for receiving a respective strain relief device 86 and for passing the optical fiber 88 of the pigtail assemblies 54 therethrough.

The compensating spacer or rod 72 is disposed between the fixed end cap 76 and the large diameter optical waveguide 40. The spacer 72 includes a stepped bore disposed axially for receiving the pigtail assembly 54 therethrough. The stepped bore has a diameter greater than the inner portion of the bore of the spacer to assure that no contact occurs between the spacer and the fiber during expansion and contraction of the athermal device 70.

The spacer 72 is formed of a metal or metal alloy, such as steel, stainless steel, aluminum, high expansion alloy. The CTEs and lengths of the large diameter optical waveguide 40, the end caps 76, 78 and the spacer 72 are selected such that the reflection wavelength of the blazed grating 56 does not substantially change over a predetermined temperature range (i.e., 100 □ C.). More specifically, the length of the spacer 72 is sized to offset the upward grating wavelength shift due to temperature and the thermal expansion of the tubular housing, waveguide and end caps. As the temperature increases, the spacer length expands faster than the optical waveguide, which shifts the grating wavelength down to balance the intrinsic wavelength shift up with increasing temperature. The length of the adjustable end cap is longer than the fixed end cap 76.

Additionally, a pair of planar surfaces 90 are ground or formed in the outer surface of the adjustable end cap 78 to maintain the adjustable end cap in a fixed rotational orientation to the tubular housing 74 and large diameter optical waveguide 40, during adjustment and mechanical burn-in process. The planar surfaces 90 are spaced radially at a predetermined angle (e.g., 120 degrees) and extend axially a predetermined length (i.e., 0.290 in.) to permit axial movement while maintaining the adjustable end cap 78 rotationally fixed. The planar surface 90 align with a pair of holes 92 disposed in the tubular housing 74, which are radially spaced 120 degrees. The holes 92 in the tubular housing 74 receive a pair of spring loaded pins (not shown), which are disposed within a collar (not shown) mounted on the outer surface of the tubular housing during assembly. The pins extend through the holes 92 to engage the planar surfaces 90 of the adjustable end cap 78, while the collar temporarily clamps the tubular housing to the adjustable end cap, before being welded to the tubular housing 74.

To complete the assembly of the athermal device 70, a ring 94, having a width substantially equal to the distance between the end of the tubular housing 74 and the strain relief boot 82, is placed over the adjustable end cap 78. The strain relief boots 82, which are formed of a polymer (e.g., Santoprene), are then snap fit into respective grooves 80 of the end caps 76, 78.

The Feedback Control

Figure 4:
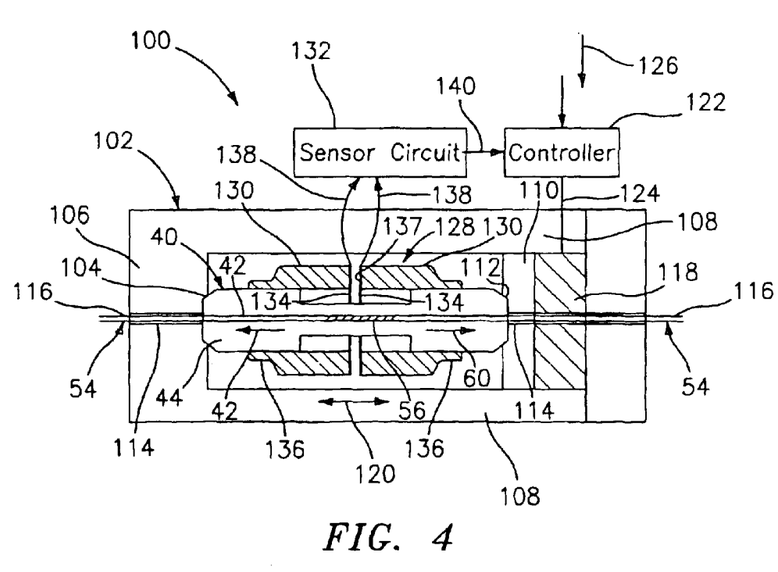
FIG. 4 is a side view of a tunable device having a positional/force feedback control circuit with an optical waveguide therein similar to that shown in FIG. 2a in accordance with the present invention.

FIG. 4 shows a tuning device 100 that compresses axially the large diameter optical waveguide 40 using a non-optical closed control loop. The tuning device 100 is similar to that disclosed in co-pending U.S. patent application, Ser. No. 09/707,084 entitled "Compression-Tuned Bragg Grating and Laser", which is hereby incorporated herein by reference in its, as well as the aforementioned co-pending U.S. patent application, Ser. No. 09/455,868.

The tuning device 100 compresses axially the large diameter optical waveguide 40 within a housing 102. One end of the large diameter optical waveguide 40 is pressed against a seat 104 in one end 106 of the housing 102. The housing also has a pair of arms (or sides) 108, which guide a movable block 110. The block 110 has a seat 112 that presses against the other end of the large diameter optical waveguide 40. The axial end faces of the large diameter optical waveguide 40 and/or the seats on mating surfaces 104, 112 may be plated with a material that reduces stresses or enhances the mating of the large diameter optical waveguide 40 with the seat on the mating surfaces. The ends of the housing 102 and the block 110 have a bore 114 drilled through them to allow the fiber 116 to pass therethrough. Instead of the recessed seats 104, 112, the end 106 of the housing 102 and the block 110 may provide a planar surface for engaging flush with the respective ends of the large diameter optical waveguide 40.

The housing 102 may be assembled such that a pre-strain or no pre-strain exists on the large diameter optical waveguide 40 prior to applying any outside forces.

An actuator 118, such as a piezoelectric actuator, engages the moveable block 110, which causes the block to move as indicated by arrows 120. Accordingly, the PZT actuator 118 provides a predetermined amount of force to the moving block 110 to compress the large diameter optical waveguide 40, and thereby tune the blazed grating 56 to a desired reflection wavelength. In response to a control signal generated by a displacement control circuit or controller 122 via conductor 124, the PZT actuator 118 is energized to provide the appropriate compression force necessary to tune the grating element to the desired Bragg reflection wavelength of the blazed grating 56. The control circuit 122 adjusts the expansion and retraction of the actuator 118 in response to an input command 126 and a displacement sensor 128 that provides feedback representative of the strain or compression of the large diameter optical waveguide 40 to form a non-optical closed-loop control configuration. In other words, light 57 propagating through the network or device is not used to provide feedback for the tuning of the blazed grating 56.

In one embodiment, the displacement sensor 128 includes a pair of capacitive elements 130 and a known displacement sensor circuit 132, similar to that disclosed in co-pending U.S. patent application Ser. No. 09/519,802, entitled, "Tunable Optical Structure Featuring Feedback Control", filed Mar. 6, 2000, which is incorporated by reference in its entirety. As shown in FIG. 4, each capacitive element 130 is generally tubular having an annular capacitive end surface 134. The capacitive elements may be formed of glass, plastic or other material. The capacitive elements 130 are mounted, such as welding or epoxy, to respective ends of the large diameter optical waveguide 40 at 136 such that the capacitive surfaces 134 are spaced a predetermined distance apart, for example, approximately 1–2 microns. Other spacings may be used if desired. The capacitive elements 130 may be bonded or secured using an epoxy or other adhesive compound, or fused to large diameter optical waveguide 40 using a $CO_2$ laser or other heating element. The capacitive surfaces 134 are coated with a metallic coating, such as gold, to form a pair of annular capacitive plates 137. The change in capacitance depends on the change in the spacing between the capacitive plates.

Electrodes 138 are attached to the capacitive plates 137 to connect the capacitor to the displacement sensor circuit 132. The sensor circuit 132 measures the capacitance between the capacitive plates 136 and provides a sensed signal 140, indicative of the measured capacitance, to the displacement controller 122. As the large diameter optical waveguide 40 is strained, the gap between the parallel capacitive plates 136 will vary, thereby causing the capacitance to change correspondingly. Specifically, as the grating is compressed, the gap between the capacitive plates 136 is reduced, resulting in an increase in capacitance. The change in capacitance is inversely proportional to the change in the reflection wavelength $\ddot{e}_b$ of the blazed grating 56. Since the capacitive elements 130 are directly connected to the large diameter optical waveguide 40, the capacitive elements are passive and will not slip. One skilled in the art would be able to implement without undue experimentation, the sensor electronics circuit 132 to measure the change in capacitance between the two capacitive plates 137.

In the operation of the tuning device 100, the controller 122 receives the wavelength input signal 126, which represents the desired reflection wavelength to tune the grating unit. In response to the input signal 126 and the sensed signal 140, which is representative of the present reflection wavelength of the blazed grating 56, the controller 122 provides a control signal 124 to the actuator 118 to increase or decrease the compression force applied to the large diameter optical waveguide 40 to set the desired reflection wavelength of the blazed grating 56. The change in applied force to the large diameter optical waveguide 40 changes the spacing between the ends of the blazed grating 56, and therefore, the spacing between the capacitive plates 137. As described above, the change in spacing of the capacitive plates 136 changes the capacitance therebetween provided to the sensor circuit 132, which provides displacement feedback to the controller 122. While the sensor circuit 132 and the controller 122 has been shown as two separate components, one would recognize that the functions of these components may be combined into a single component. One example of a closed loop actuator 118 that may be used is Model No. CM (controller) and DPT-C-M (for a cylindrical actuator) made by Queensgate, Inc. of N.Y.

Although the invention has been described with respect to using a capacitor 128 to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of a large diameter optical waveguide 40, one should recognize that the tuning devices may be accurately and repeatably compressed and thus may operate in an open loop mode.

Alternatively, instead of using a piezoelectric actuator 118, the large diameter optical waveguide 40 may be compressed by another actuator, such as a solenoid, pneumatic force actuator, or any other device that is capable of directly or indirectly applying an axial compressive force on the large diameter optical waveguide 40. Further, a stepper motor or other type of motor whose rotation or position can be controlled may be used to compress the waveguide. A mechanical linkage connects the motor, e.g., a screw drive, linear actuator, gears, and/or a cam, to the movable block 110 (or piston), which cause the block to move as indicated by arrows 120, similar to that described in pending U.S. patent application Ser. No. 09/751,589 entitled "Wide Range Tunable Optical Filter", filed Dec. 29, 2000 (CC-0274A); and U.S. patent application Ser. No. 09/752,332 entitled "Actuator Mechanism for Tuning an Optical Device", filed Dec. 29, 2000. (CC-0322), which are incorporated herein by reference. The stepper motor may be a high resolution stepper motor driven in a microstepping modeas is known in the art.

Alternatively, the blazed grating 56 may be tuned by mechanically stressing (i.e. tension, bending) the grating elements, or varying the temperature of the grating (i.e., using a heater) or any such method as is known in the art.

Figure 5A:
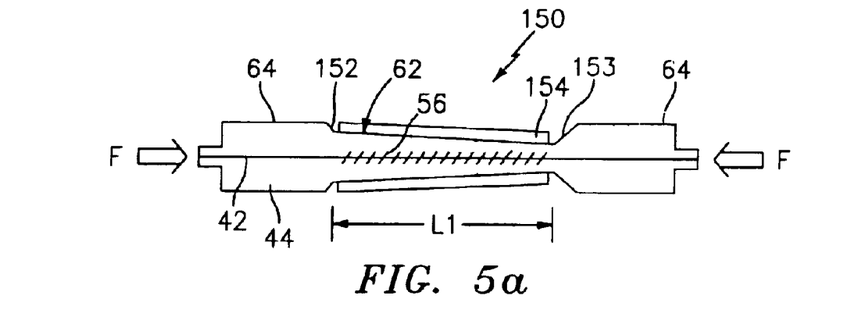
FIG. 5a is a side view of another embodiment of an optical waveguide having a tapered central section with a blazed Bragg grating written therein in accordance with the present invention.
Figure 5B:
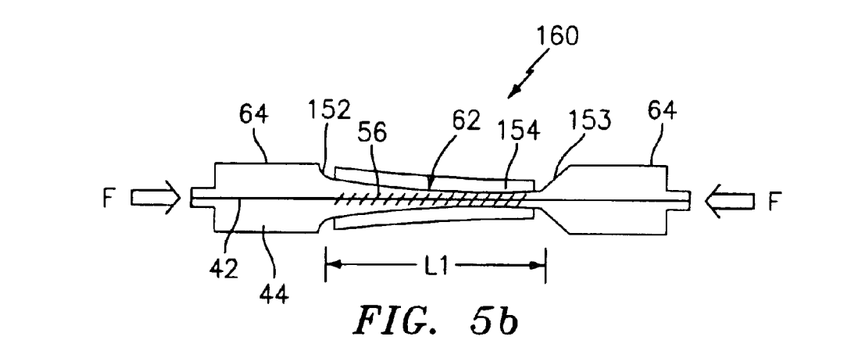
FIG. 5b is a side view of another embodiment of an optical waveguide having a quadratically tapered central section with a blazed Bragg grating written therein in accordance with the present invention.
Figure 5C:
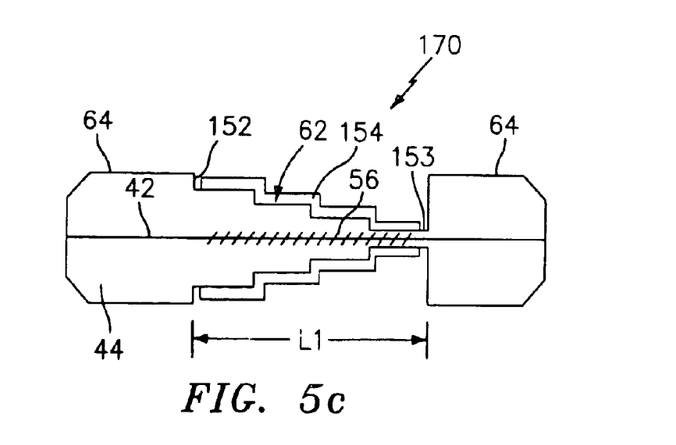
FIG. 5c is a side view of another embodiment of an optical waveguide having a step-like tapered central section with a blazed Bragg grating written therein in accordance with the present invention.

FIGS. 5a, 5b, 5c: Tapered Cane Structure Designs

FIGS. 5a, 5b, 5c show tapered cane design structures that may be used in combination with the blazed grating design of the present invention.

In particular, the diameter d3 of the narrower central section 62 of the large diameter optical waveguide 40 shown in FIG. 2a is narrower than the diameter d4 of the two wider outer sections 64. With the arrangement as shown in FIG. 2a, when an axial compressive force F is exerted at the ends of the large diameter optical waveguide 40, the axial force applied to the narrower central section 62 is magnified by the mechanical advantage provided by the geometry of the cladding 44. More specifically, the axial force exerted onto the narrower central section 62 is effectively magnified by a factor substantially equal to the ratio of the cross-section of the wider outer sections 64 to the cross section of the narrower central section 62. This geometry renders it practical to compression-tune the Bragg grating gain filter with high precision. If the cross-section of the narrower central section 62 of the large diameter optical waveguide 40 is uniform throughout the narrower central section containing the Bragg grating(s) 56, then the shape of a given grating profile will remain substantially the same while the central wavelength (or reflection wavelength $\ddot{e}_B$) of the given grating profile shifts.

In some occasions, however, it may be desirable to change statically or dynamically the shape of the given grating profile. As shown in FIGS. 5a, 5b, 5c, this may be accomplished by varying the cross-sectional area of the central section of the large diameter waveguide 150, 160, 170 along its length L1.

FIG. 5a: Linear Taper

FIG. 5a shows how the narrower central section 62 of the large diameter waveguide 150 may be linearly tapered, such that a first end 152 of the narrower central section 62 is wider than a second end 153. Accordingly, when the large diameter waveguide 150 is compressed by an axial force F, the blazed grating 56 is linearly chirped, and thereby changes the shape of the given grating profile, accordingly. Additionally, a thermal device 154 (e.g., heater TEC or any heating or cooling device) may be wrapped around the narrower central section 62 of the large diameter waveguide 150 to tune the center wavelength of the blazed grating 56 along a spectral range.

FIG. 5b: Quadradically Taper

FIG. 5b shows how the narrower central section 62 of the large diameter waveguide 160 may be quadradically tapered, such that a first end 152 of the narrower central section 62 is wider than a second end 153. Accordingly, when the waveguide 160 is compressed by an axial force F, the blazed grating 56 is quadradically chirped, and thereby changes the shape of the given grating profile of the blazed grating 56 accordingly. Similarly, the thermal device 154 may be wrapped around the narrower central section 62 of the large diameter waveguide 160 to tune the center (or reflection) wavelength of the blazed grating 56 along a spectral range.

FIG. 5c: Step-like Taper

FIG. 5c shows how the narrower central section 62 of the waveguide 170 may be tapered in a stepped fashion, such that a first end 152 of the narrower central section 62 is wider than a second end 153. Accordingly, when the waveguide 170 is compressed by an axial force F, the blazed grating 56 is linearly tuned at discrete locations along the narrower central section 62, and thereby changes the shape of the given grating profile accordingly. Similarly, the thermal device 154 may be wrapped around the narrower central section 62 of the waveguide 170 to tune the center (or reflection) wavelength of the blazed grating along a spectral range.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. A large diameter optical waveguide having an outer cladding and a core, the waveguide comprising:

the outer cladding surrounding the inner core and the outer cladding having an outside diameter of at least about 0.3 millimeters, said core propagating light in substantially only a few spatial modes; and the inner core having a blazed grating therein;

wherein the waveguide disposed at a portion of the blazed grating has a cross-section perpendicular to a longitudinal axis that is continuous and comprises the same material.

2. A large diameter waveguide according to claim 1, wherein the blazed grating is written into the inner core at an oblique angle relative to a longitudinal axis of the inner core either for attenuating optical light traveling in the optical waveguide, or for reflecting optical light to or from the optical waveguide.

3. A large diameter waveguide according to claim 1, wherein the blazed grating has an optical parameter that changes in response to the application of a compressive force on the optical waveguide.

4. A large diameter waveguide according to claim 1, wherein the outer cladding has the blazed grating written therein, or a combination of the inner core and the cladding has the blazed grating therein.

5. A large diameter waveguide according to claim 1, wherein the blazed grating includes a plurality of concatenated periodic or aperiodic gratings.

6. A large diameter waveguide according to claim 1, further comprising an inner cladding positioned between the outer cladding and the inner core.

7. A large diameter waveguide according to claim 1, wherein the optical waveguide is shaped like a dogbone structure having wider outer sections and a narrower central section inbetween.

8. A large diameter waveguide according to claim 7, wherein the blazed grating is written in the narrower central section of the dogbone structure.

9. A large diameter waveguide according to claim 8, wherein the narrower central section has a tapered shape.

10. A large diameter waveguide according to claim 9, wherein the tapered shape is linear.

11. A large diameter waveguide according to claim 10, wherein the tapered shape is quadratic.

12. A large diameter waveguide according to claim 11, wherein the tapered shape includes a step-like shape.

13. A large diameter waveguide according to claim 7, further includes a thermal device in heat exchange relationship with the narrower central section of the optical waveguide to tune the center wavelength of the blazed grating along a spectral range.

14. The optical filter of claim 1, wherein said core has an outer core dimension of less than about 12.5 microns.

15. The optical filter of claim 1, wherein said core propagates light in substantially a single spatial mode.

16. The optical filter of claim 1, wherein said material is a glass material.

17. The optical filter of claim 1, wherein said material is formed of silica.

* * * * *